(12) United States Patent
Kim et al.

(10) Patent No.: US 12,441,843 B2
(45) Date of Patent: Oct. 14, 2025

(54) DIFFRACTION LIGHT GUIDE PLATE AND MANUFACTURING METHOD THEREOF

(71) Applicant: LG CHEM, LTD., Seoul (KR)

(72) Inventors: Jaeyoung Kim, Daejeon (KR); Hee Jung Choi, Daejeon (KR); Yeongrae Chang, Daejeon (KR); Heon Kim, Daejeon (KR); Hye Min Kim, Daejeon (KR); Youngsuk Kim, Daejeon (KR); Soonhwa Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1016 days.

(21) Appl. No.: 17/608,719

(22) PCT Filed: Aug. 13, 2020

(86) PCT No.: PCT/KR2020/010731
§ 371 (c)(1),
(2) Date: Nov. 3, 2021

(87) PCT Pub. No.: WO2021/029693
PCT Pub. Date: Feb. 18, 2021

(65) Prior Publication Data
US 2022/0315707 A1    Oct. 6, 2022

(30) Foreign Application Priority Data
Aug. 14, 2019  (KR) .................. 10-2019-0099705
Aug. 11, 2020  (KR) .................. 10-2020-0100670

(51) Int. Cl.
*C08G 75/08*   (2006.01)
*B29C 43/00*   (2006.01)
(Continued)

(52) U.S. Cl.
CPC ............ *C08G 75/08* (2013.01); *B29C 43/003* (2013.01); *B29C 43/021* (2013.01);
(Continued)

(58) Field of Classification Search
None
See application file for complete search history.

(56) References Cited

U.S. PATENT DOCUMENTS 6,117,923 A    9/2000   Amagai et al.
7,136,205 B1   11/2006  Kaye
(Continued)

FOREIGN PATENT DOCUMENTS

CN    101711410 A    5/2010
CN    106842397 A    6/2017
(Continued)

*Primary Examiner* — Eli D. Strah
(74) *Attorney, Agent, or Firm* — Seed Intellectual Property Law Group LLP

(57) ABSTRACT

A diffraction light guide plate comprising an optical layer having diffraction lattice pattern formed as an integrated structure without an interface on one surface thereof, where the optical layer having diffraction lattice pattern is a continuous phase of polymer comprising an episulfide compound, a thiol compound, and an aromatic cyclic compound having two or more hydroxyl groups, the diffraction light guide plate having excellent thickness uniformity and flatness as well as low haze and excellent visibility, and excellent mechanical properties such as pencil hardness and strength, and a method for manufacturing the diffraction light guide plate.

9 Claims, 1 Drawing Sheet

(51) Int. Cl.
  *B29C 43/02* (2006.01)
  *B29D 11/00* (2006.01)
  *C08L 81/02* (2006.01)
  *F21V 8/00* (2006.01)
  *G02B 5/18* (2006.01)
  *B29K 105/00* (2006.01)
  *B29L 11/00* (2006.01)

(52) U.S. Cl.
  CPC ........ *B29D 11/00663* (2013.01); *C08L 81/02* (2013.01); *G02B 5/1814* (2013.01); *G02B 5/1847* (2013.01); *G02B 6/005* (2013.01); *G02B 6/0065* (2013.01); *B29C 2043/025* (2013.01); *B29K 2105/0094* (2013.01); *B29K 2995/0031* (2013.01); *B29K 2995/0046* (2013.01); *B29K 2995/0073* (2013.01); *B29K 2995/0082* (2013.01); *B29K 2995/0094* (2013.01); *B29L 2011/0075* (2013.01)

(56) References Cited

U.S. PATENT DOCUMENTS

| | | | |
|---|---|---|---|
| 9,283,185 | B2 | 3/2016 | Kurzrock et al. |
| 9,458,293 | B2 | 10/2016 | Aoki et al. |
| 2003/0052838 | A1 | 3/2003 | Kim et al. |
| 2006/0256071 | A1 | 11/2006 | Kim et al. |
| 2007/0209393 | A1 | 9/2007 | Miller et al. |
| 2009/0185470 | A1 | 7/2009 | Stoeckel et al. |
| 2009/0224416 | A1 | 9/2009 | Laakkonen et al. |
| 2010/0259821 | A1* | 10/2010 | Kaida .................. C08F 292/00 359/485.05 |
| 2010/0298519 | A1 | 11/2010 | Nakamura et al. |
| 2011/0019874 | A1 | 1/2011 | Jarvenpaa et al. |
| 2011/0139234 | A1 | 6/2011 | Iizuka et al. |
| 2013/0005934 | A1 | 1/2013 | Nakamura et al. |
| 2014/0144506 | A1 | 5/2014 | Iizuka et al. |
| 2014/0378628 | A1 | 12/2014 | Aoki et al. |
| 2015/0380500 | A1 | 12/2015 | Masui et al. |
| 2016/0152774 | A1 | 6/2016 | Namiki et al. |
| 2016/0297107 | A1 | 10/2016 | Shim et al. |
| 2017/0227775 | A1 | 8/2017 | Hofmann et al. |
| 2018/0047581 | A1 | 2/2018 | Ito et al. |
| 2018/0127549 | A1 | 5/2018 | Imagawa et al. |
| 2019/0127530 | A1 | 5/2019 | Namiki et al. |
| 2020/0338792 | A1 | 10/2020 | Kim et al. |
| 2020/0355932 | A1* | 11/2020 | Kim ...................... G06T 19/006 |
| 2021/0063619 | A1 | 3/2021 | Yoon et al. |

FOREIGN PATENT DOCUMENTS

| | | | |
|---|---|---|---|
| CN | 107003446 A | | 8/2017 |
| CN | 108780166 A | | 11/2018 |
| JP | 1995-114006 A | | 5/1995 |
| JP | 1997-222516 A | | 8/1997 |
| JP | 2000-256554 A | | 9/2000 |
| JP | 2001-163978 A | | 6/2001 |
| JP | 2001-171012 A | | 6/2001 |
| JP | 2002-047346 A | | 2/2002 |
| JP | 2005-239553 A | | 9/2005 |
| JP | 2005-272418 A | | 10/2005 |
| JP | 2006-003624 A | | 1/2006 |
| JP | 2006-106361 A | | 4/2006 |
| JP | 2006-215349 A | | 8/2006 |
| JP | 2007-093803 A | | 4/2007 |
| JP | 2009-512906 A | | 3/2009 |
| JP | 2009-516225 A | | 4/2009 |
| JP | 2011-225644 A | | 11/2010 |
| JP | 4734473 B2 | | 7/2011 |
| JP | 2012-068376 A | | 4/2012 |
| JP | 2013-028574 A | | 2/2013 |
| JP | 2013227395 A | * | 11/2013 |
| JP | WO2013-115212 A1 | | 5/2015 |
| JP | 2015-0199841 A | | 11/2015 |
| JP | 2015-212395 A | | 11/2015 |
| JP | 2015199841 A | * | 11/2015 |
| JP | 2016-013932 A | | 1/2016 |
| JP | 2016-029162 A | | 3/2016 |
| JP | 2016084381 A | * | 5/2016 |
| JP | 2016-107524 A | | 6/2016 |
| JP | 2016-191733 A | | 11/2016 |
| JP | 2016-216485 A | | 12/2016 |
| JP | 6098112 B2 | | 3/2017 |
| JP | 2017-138597 A | | 8/2017 |
| JP | 2017-530406 A | | 10/2017 |
| JP | 6306403 B2 | | 4/2018 |
| JP | WO2016-204080 A1 | | 6/2018 |
| KR | 10-0874756 B1 | | 12/2008 |
| KR | 10-2010-0052275 A | | 5/2010 |
| KR | 10-2010-0081976 A | | 7/2010 |
| KR | 10-1096368 B1 | | 12/2011 |
| KR | 10-2015-0022665 A | | 3/2015 |
| KR | 10-1608961 B1 | | 5/2016 |
| KR | 10-2017-0117586 A | | 10/2017 |
| KR | 10-2018-0005275 A | | 1/2018 |
| KR | 1020190029489 A | | 3/2019 |
| KR | 10-2019-0050718 A | | 5/2019 |
| KR | 10-2019-0072435 A | | 6/2019 |
| WO | 2008125229 A1 | | 10/2008 |
| WO | 2012-147710 A1 | | 11/2012 |
| WO | WO-2019117588 A1 | * | 6/2019 ............ G02B 1/041 |

* cited by examiner

[FIG. 1]
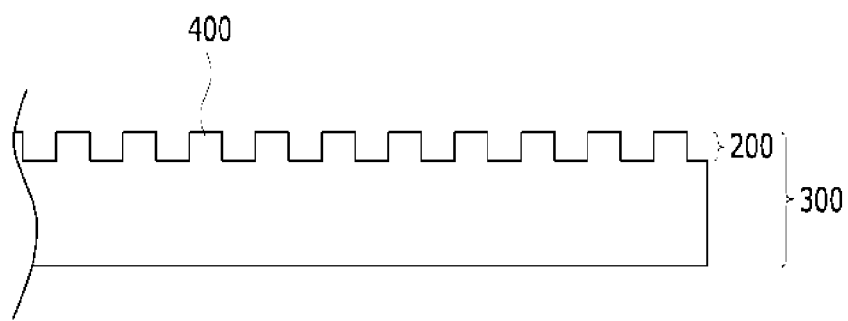
[FIG. 2]
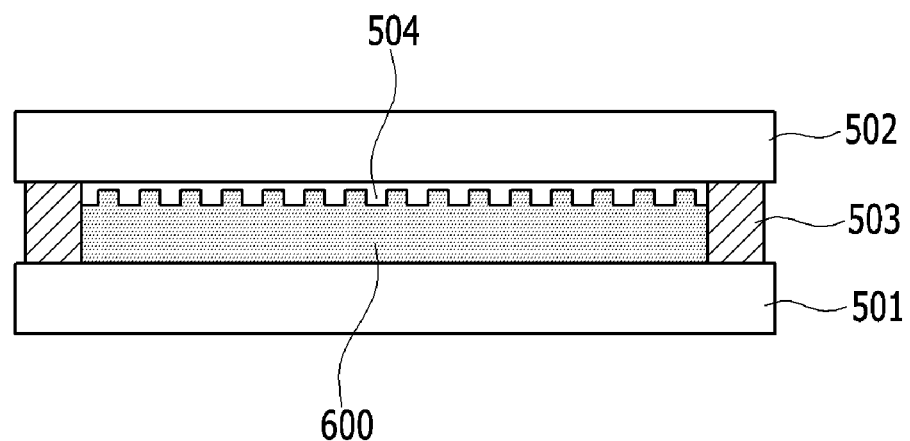

DIFFRACTION LIGHT GUIDE PLATE AND MANUFACTURING METHOD THEREOF

CROSS-REFERENCE TO RELATED APPLICATION(S)

This application is the U.S. national stage of International Application No. PCT/KR2020/010731 filed on Aug. 13, 2020, which claims the benefit of Korean Patent Application No. 10-2019-0099705 filed on Aug. 14, 2019 and Korean Patent Application No. 10-2020-0100670 filed on Aug. 11, 2020, the disclosures of which are herein incorporated by reference in their entirety.

FIELD OF DISCLOSURE

The present disclosure relates to a diffraction light guide plate and a method for manufacturing a diffraction light guide plate.

BACKGROUND

Recently, devices for providing three dimensional images to users have been being developed, using a virtual reality device and an augmented reality device, and the like.

The virtual reality device and augmented reality device can make desired images visible to a user by forming a diffraction light guide pattern on lens such as common eyeglasses.

In general, glass with high refractive index is used as lens for a virtual reality device or an augmented reality device. Glass may have high refractive index, light transmission, flatness and strength, but it may cause a serious damage to the eyeball of a user when broken, and may cause discomfort when worn for a long time due to its high density and heavy weight.

Thus, studies are needed for lenses that has high light transmission and high refractive index, and that is light and relatively safe when broken, to be applicable for a virtual reality device or an augmented reality device.

High refractive index plastic, for replacing glass, is very light and can implement various colors, but properties such as surface flatness and thickness uniformity are significantly inferior to conventional glass.

Furthermore, the high refractive index plastic may be deformed due to low strength during an imprint process for forming a diffraction lattice, may cause haze in final products in case inorganic particles are used in large quantities to implement high refractive index, and may have difficulty in securing high pencil hardness due to poor interfacial adhesion with a substrate, and thus, studies for improvement thereof are needed.

SUMMARY

The present disclosure provides a diffraction light guide plate that has excellent thickness uniformity and flatness, that has low haze and excellent mechanical properties such as pencil hardness, strength and the like, that is lighter than glass or tempered glass, and that can implement high refractive index.

The present disclosure also provides a method for manufacturing a diffraction light guide plate to manufacture the diffraction light guide plate by a simple process.

There is provided a diffraction light guide plate comprising an optical layer having diffraction lattice pattern formed as an integrated structure without an interface on one surface thereof, wherein the difference in refractive index between the diffraction lattice pattern and the one surface of the optical layer is 0.01 or less, and wherein the optical layer having diffraction lattice pattern formed on one surface is a continuous phase of polymer comprising an episulfide compound, a thiol compound, and an aromatic cyclic compound having two or more hydroxyl groups.

There is also provided a method for manufacturing a diffraction light guide plate comprising steps of: preparing mold equipment comprising a flat lower substrate, a flat upper substrate, buffer spacers positioned between the flat lower substrate and the flat upper substrate, and a template engraved with diffraction lattice pattern included in the flat lower substrate or flat upper substrate, wherein a molding space is partitioned by the buffer spacers; fully charging a curable composition in the molding space; and compressing the curable composition with a load of the flat upper substrate, and curing the curable composition, wherein the curable composition comprises an episulfide compound, a thiol compound, and an aromatic cyclic compound having two or more hydroxyl groups, and wherein the step of compressing the curable composition with a load of the flat upper substrate and curing the curable composition is conducted so as to fulfill the following Formula 1:

$$\{(\text{load of flat upper substrate} + \text{shrinking force of curable composition}) \times 0.95\} \leq \text{compressive stress of buffer spacer} \{(\text{load of flat upper substrate} + \text{shrinking force of curable composition}) \times 1.05\}. \quad [\text{Formula 1}]$$

Hereinafter, a diffraction light guide plate and a method for manufacturing a diffraction light guide plate according to specific embodiments of the present disclosure will be explained in detail.

Throughout the specification, when it is described that a part "comprises" a constructional element, unless specifically described to the contrary, it does not mean that other constructional elements are excluded but it means that other constructional elements may be further included.

And, when it is described that a member is positioned "on" the other member, it includes not only a case wherein a member is in contact with the other member, but also a case wherein other members exist between two members.

And, the term "step of~" does not mean "step for~".

As used herein, an "episulfide compound" means a compound comprising one or more episulfide, and the episulfide means a compound in which an oxygen(O) atom of epoxide is substituted with a sulfur(S) atom.

As used herein, a "thiol compound" means a compound comprising one or more thiol groups(—SH).

As used herein, "curing" means both thermal curing and photocuring, and a "curable composition" means a thermally curable and/or photocurable composition.

As used herein, high refractive index means about 1.6 or more at a wavelength region of 350 to 800 nm or at a wavelength of 532 nm.

According to one embodiment of the present disclosure, there is provided a diffraction light guide plate comprising an optical layer having diffraction lattice pattern formed on one surface, wherein the diffraction lattice pattern is formed as an integrated structure without an interface on the one surface of the optical layer, difference in refractive index between the diffraction lattice pattern and the one surface of the optical layer is 0.01 or less, and the optical layer having diffraction lattice pattern formed on one surface thereof is a continuous phase of polymer comprising an episulfide compound, a thiol compound, and an aromatic cyclic compound having two or more hydroxyl groups.

In the optical layer having a diffraction lattice pattern formed on one surface, included in the diffraction light guide plate according to the one embodiment, mechanical properties such as pencil hardness, strength, and the like of the diffraction light guide plate are excellent when the diffraction lattice pattern is formed as an integrated structure without an interface on the one surface of the optical layer, and when such an optical layer is a continuous phase of polymer comprising an episulfide compound, a thiol compound, and an aromatic cyclic compound having two or more hydroxyl groups. In addition, since there is little difference in refractive index between the diffraction lattice pattern and the one surface of the optical layer, there are no problems of transmittance decrease or haze generation caused by an interface, and the efficiency of total reflection of light entering into the diffraction light guide plate is increased, and thus high resolution image with higher luminance can be displayed when the diffraction light guide plate is used for virtual reality devices and the like.

Previously, a light guide plate having a pattern part was prepared through the processes of applying and drying an imprint resin composition on a substrate to form a resin layer, and then, imprinting a template engraved with a diffraction lattice pattern on the resin layer. However, a diffraction light guide plate prepared by such a method had an interface between a substrate and a pattern part, and the interfacial adhesion was poor, and thus, it was difficult to secure mechanical properties such as pencil hardness, and the like. However, the diffraction light guide plate according to one embodiment may exhibit excellent mechanical properties such as high pencil hardness and strength, and the like, because the diffraction lattice pattern is formed as an integrated structure without an interface on one surface of the optical layer.

And, since the optical layer having a diffraction lattice pattern formed on one surface, which is included in the diffraction light guide plate, is a continuous phase of polymer comprising an episulfide compound, a thiol compound, and an aromatic cyclic compound having two or more hydroxyl groups, it has high refractive index similar to glass, and may be used as a diffraction light guide lens of a wearable device. Thus, the existing problems generated by breakage of glass and difficulty in extended wear due to heavy weight of glass, and the like may be prevented. Moreover, even if the diffraction light guide plate does not further comprise inorganic particles, it can realize high refractive index, and thus it has low haze and high visibility because haze due to inorganic particles is not caused. And, the diffraction light guide plate may be prepared by a manufacturing method of a diffraction light guide plate as explained later, and thereby, it may have excellent thickness uniformity and flatness.

Since the optical layer having a diffraction lattice pattern formed on one surface is a continuous phase of polymer comprising an episulfide compound, a thiol compound, and an aromatic cyclic compound having two or more hydroxyl groups, a difference in refractive index between the diffraction lattice pattern and the one surface of the optical layer may be 0.01 or less, 0.05 or less, 0.001 or less, or 0.001 to 0.0001. If the difference in refractive index between the diffraction lattice pattern and the one surface of the optical layer is greater than 0.01, due to an interface between the diffraction lattice pattern and the one surface of the optical layer, transmittance may decrease or haze may be generated. Thus, since a difference in refractive index between the diffraction lattice pattern and the one surface of the optical layer satisfies the above range, there is no problem of decrease in transmittance or generation of haze caused by an interface, and total reflection efficiency of light guide may be increased, and thus an image with higher luminance may be displayed when used for virtual reality devices and the like.

FIG. 1 is a schematic diagram showing the cross section of an optical layer included in a diffraction light guide plate according to one embodiment. Specifically, on one surface of the optical layer(300), a diffraction lattice pattern(200) is formed, and the diffraction lattice pattern may comprise one or more pattern units(400).

Specifically, the diffraction lattice pattern(200) may comprise two or more pattern units(400) spaced apart along the direction from one side to the other side. The pattern unit is not specifically limited as long as it can diffract guide light, but it may be a lattice pattern having a shape of quadrangular prism, hexagonal prism, triangular pyramid, cone, elliptical cone, or hemisphere, or a bar or stripe pattern. Meanwhile, the shape of the cross-section of the pattern unit is not specifically limited, but for example, it may have a shape of quadrangle, triangle, rhombus, trapezoid, parabola, and the like. The direction of the cross-section of the pattern unit may be perpendicular to the diffraction light guide plate.

And, a pitch of the pattern units(400) included in the diffraction lattice pattern(200) may be 0.1 to 1 μm, 0.2 to 0.9 μm, 0.3 to 0.8 μm or 0.4 to 0.7 μm, and a height may be 0.1 to 1 μm, 0.2 to 0.9 μm, 0.3 to 0.8 μm or 0.4 to 0.7 μm.

The pitch means an interval of the pattern units(400) repeated, and specifically, it may mean a length between one point of one pattern unit and one point of another pattern unit adjacent thereto. And, one point of one pattern unit and one point of another pattern unit may mean positions corresponding to each other, and the length direction is a direction parallel to an optical layer(300). And, the height direction is a direction perpendicular to the optical layer.

In case the diffraction lattice pattern(200) comprises two or more pattern units(400), two or more pattern units may be identical, and specifically, the shape of the cross-section, pitch, height, and the like may be identical to each other. Thus, amount of light diffracted over the entire area of the diffraction light guide plate may be identical. And, two or more pattern units(400) included in the diffraction lattice pattern(200) may be different, and specifically, the shape of the cross-section may be identical but the pitch and height may be different, or the pitch may be identical but the shape of the cross-section and the height may be different.

The thickness of the diffraction light guide plate is 0.1 to 10 mm.

The thickness of the optical layer(300) may be 0.1 to 10 mm, 0.2 to 9 mm, 0.3 to 8 mm, 0.4 to 7 mm, or 0.5 to 5 mm. If the thickness of the optical layer(300) is too thin, the number of total reflection of light entering into the diffraction light guide plate comprising the optical layer may unnecessarily increase, and the luminance of light emitted from the diffraction light guide plate may be lowered, and thus resolution may be degraded when such a diffraction light guide plate is used for a virtual reality device and the like. Meanwhile, if the thickness of the optical layer is too thick, transmittance of external light to the diffraction light guide plate comprising the optical layer may decrease, and luminance of external image may decrease, and thus visibility may be degraded.

The optical layer(300) having a diffraction lattice pattern (200) formed on one surface may be a continuous phase of polymer comprising an episulfide compound, a thiol compound, and an aromatic cyclic compound having two or more hydroxyl groups.

The diffraction light guide plate may be manufactured by one-step process, by a manufacturing method of a diffraction light guide plate as explained later, and thus the diffraction lattice pattern is formed as an integrated structure without an interface on one surface of the optical layer, and the optical layer and the diffraction lattice pattern formed on the one surface of the optical layer may comprise the cured product of the same curable composition. Namely, the optical layer having a diffraction lattice pattern formed on one surface corresponds to a continuous phase of polymer comprising an episulfide compound, a thiol compound, and an aromatic cyclic compound having two or more hydroxyl groups. And, the continuous phase of polymer can realize high refractive index without including inorganic particles, thus preventing haze generated when a large quantity of inorganic particles are used.

The weight ratio of the thiol compound to the aromatic cyclic compound having two or more hydroxy groups may be 5:5 to 9:1, 7:3 to 8.5:1.5, or 7:3 to 8:2. If the weight ratio of the thiol compound to the aromatic cyclic compound having two or more hydroxy groups is less than 5.5, it may be difficult to realize high refractive index of the diffraction light guide plate, and if it is greater than 9:1, it may be difficult to control the curing speed of a curable composition comprising the same, thus generating cord in the diffraction light guide plate.

The episulfide compound may comprise a compound represented by the following Chemical Formula 1.

[Chemical Formula 1]

in Chemical Formula 1,
$R_1$ and $R_2$ are each independently hydrogen or C1 to C10 alkyl,
$R_3$ and $R_4$ are each independently a single bond or C1 to C10 alkylene,
a is an integer of 0 to 4, and
b is an integer of 0 to 6, The episulfide compound represented by Chemical Formula 1 has an aliphatic chain backbone with episulfides linked to both ends, and in the aliphatic chain, it may comprise thio ether repeat units in which alkylene groups are linked by sulfur(S) atoms.

The episulfide compound, due to the above explained chemical structure, may comprise high content of sulfur(S) atoms having high atomic refraction in the molecule, and by such high sulfur atom content, it can increase refractive index of a diffraction guide light plate. And, the episulfide compound may be cured by ring opening polymerization, and alkylene sulfide groups formed by ring opening polymerization of episulfide groups may further increase high refractive index of a diffraction light guide plate.

Meanwhile, in Chemical Formula 1, each of $R_1$ and $R_2$ may be independently hydrogen or a methyl group, but is not limited thereto.

And, each of $R_3$ and $R_4$ may be independently a single bond, methylene, ethylene, propylene, isopropylene, butylenes, or isobutylene, but is not limited thereto.

And, each of a and b may be independently 0 or 1.

In Chemical Formula 1, a relates to the carbon number of an alkylene group included in the thio ether repeat unit, and if a is too large, the length of carbon chain in the molecule may lengthen, and glass transition temperature of a diffraction light guide plate may be lowered, and thus heat resistance of a diffraction light guide plate may be deteriorated, and the relative content of sulfur may decrease, and thus refractive index of a diffraction light guide plate may be lowered.

In Chemical Formula 1, b is the repeat number of thio ether repeat units in which alkylene groups are linked by sulfur(S) atoms, and if b is too large, the chain length of the molecule may lengthen, glass transition temperature of a diffraction light guide plate may be lowered during curing, and thus heat resistance of a diffraction light guide plate may be deteriorated.

And, the compound represented by Chemical Formula 1 may be used alone, or in combinations of two or more kinds.

The episulfude compound may comprise at least one selected from the group consisting of bis(β-epithiopropyl) sulfide, bis(β-epithiopropyl)disulfide, bis(β-epithiopropyl-thio)methane, 1,2-bis(β-epithiopropylthio)ethane, 1,3-bis(β-epithiopropylthio)propane, 1,4-bis(β-epithiopropylthio) butane, and the like, but is not limited thereto.

The content of the episulfide compound may be 50 to 99 wt %, 60 to 95 wt %, or 70 to 90 wt %, based on 100 wt % of the entire diffraction light guide plate. If the content of the episulfide compound is too large, glass transition temperature of a diffraction light guide plate may be lowered, and yellow index(YI) may increase. Meanwhile, if the content of the episulfide compound is too small, glass transition temperature of a diffraction light guide plate may be lowered, yellow index(YI) may increase, and mechanical properties such as hardness and strength, and the like may be deteriorated.

The thiol compound may comprise at least one selected from compounds represented by the following Chemical Formulas 2 and 3.

[Chemical Formula 2]

in Chemical Formula 2,
$R_5$ and $R_6$ are each independently a single bond or C1 to C1.0 alkylene,
c is an integer of 0 to 4,
d is an integer of 0 to 6,

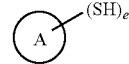

[Chemical Formula 3]

in Chemical Formula 3,
ring A is a 5- or 6-membered aromatic heterocycle comprising one or more of nitrogen(N) and sulfur(S) atoms, and
e is an integer of 1 to 3.

Specifically, the thiol compound represented by Chemical Formula 2 has an aliphatic chain backbone with thiol groups(—SH) linked to both ends, and in the aliphatic chain, it may comprise thio ether repeat units in which alkylene groups are linked by sulfur(S) atoms.

Meanwhile, the thiol compound represented by Chemical Formula 3 may have a structure wherein one or more thiol groups are linked to 5- or 6-membered aromatic ring comprising heteroatom such as nitrogen(N) and/or sulfur(S).

The thiol compound represented by Chemical Formula 2 or 3 may react with episulfide groups to form disulfide bonds, by a curing reaction with the episulfide compound, namely, ring opening polymerization of episulfide groups, and it comprises high content of sulfur(S) atoms having high atomic refraction in the molecule and thus may further increase refractive index of a diffraction light guide plate, and improve physical strength of a diffraction light guide plate.

Meanwhile, in Chemical Formula 2, each of $R_5$ and $R_6$ may be independently a single bond, methylene, ethylene, propylene, isopropylene, butylenes, or isobutylene, but is not limited thereto.

And, each of c and d may be independently 0 or 1.

In Chemical Formula 2, c relates to the carbon number of an alkylene group included in the thio ether repeat unit, and if c is too large, the length of carbon chain in the molecule may lengthen, and glass transition temperature of a diffraction light guide plate may be lowered, and thus heat resistance of a diffraction light guide plate may be deteriorated, and the relative content of sulfur may decrease, and thus refractive index of a diffraction light guide plate may be lowered.

In Chemical Formula 2, d is the repeat number of thio ether repeat units in which alkylene groups are linked by sulfur(S) atoms, and if d is too large, the chain length of the molecule may lengthen, glass transition temperature of a diffraction light guide plate may be lowered, and thus heat resistance of a diffraction light guide plate may be deteriorated.

And, in Chemical Formula 3, ring A may be pyridine, pyrimidine, triazine, imidazole, thiophene, thiozole, or thiadiazole, but is not limited thereto.

And, e may be 2 or 3.

And, the compound represented by Chemical Formula 2 or 3 may be used alone, or in combinations of two or more kinds.

The thiol compound may comprise, for example, at least one selected from the following compounds.

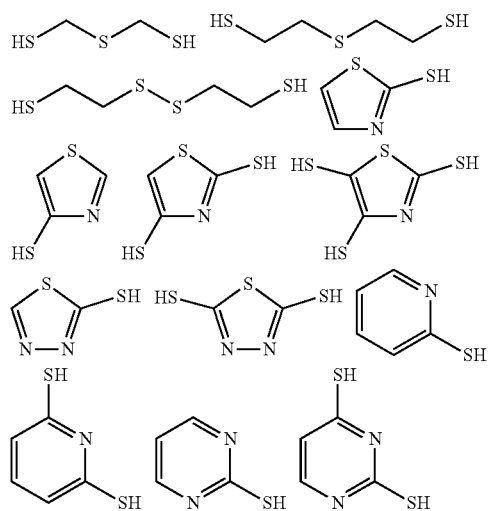

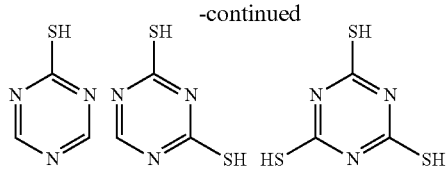

The content of the thiol compound may be 1 to 30 wt %, 5 to 25 wt %, or 7 to 10 wt %, based on 100 wt % of the entire diffraction light guide plate. If the content of the thiol compound is too large, glass transition temperature of a diffraction light guide plate may be lowered, yellow index (YI) may increase, and physical properties such as hardness and strength, and the like may be deteriorated. Meanwhile, if the content of the thiol compound is too small, glass transition temperature of a diffraction light guide plate may be lowered, and yellow index(YI) may increase.

The aromatic cyclic compound having two or more hydroxyl groups may comprise at least one selected from compounds represented by the following Chemical Formulas 4 and 5:

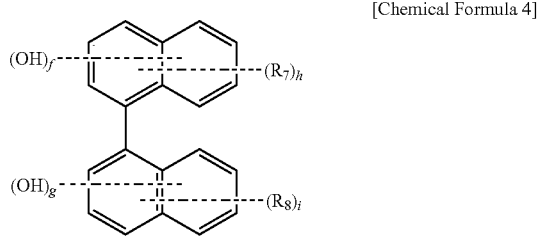

[Chemical Formula 4]

in Chemical Formula 4,
$R_7$ and $R_8$ are each independently deuterium, halogen, cyano, nitrile, nitro, amino, C1 to C40 alkyl, C1 to C40 alkoxy, C3 to C40 cycloalkyl, C1 to C40 alkenyl, C6 to C60 aryl, or C1 to C40 heteroaryl comprising one or more of O, N, Si and S,
f and g are each independently an integer of 1 to 7,
h and i are each independently an integer of 0 to 6,
f+h is an integer of 7 or less, and
g+i is an integer of 7 or less,

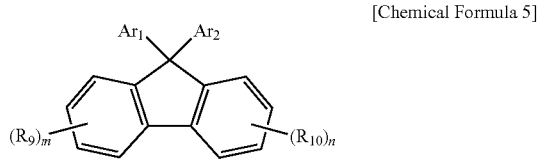

[Chemical Formula 5]

in Chemical Formula 5,
$Ar_1$ and $Ar_2$ are each independently C6 to C60 aryl substituted with one or more hydroxyl groups
$R_9$ and $R_{10}$ are each independently deuterium, halogen, cyano, nitrile, nitro, amino, C1 to C40 alkyl, C1 to C40 alkoxy, C3 to C40 cycloalkyl, C1 to C40 alkenyl, C6 to C60 aryl, or C1 to C40 heteroaryl comprising one or more of O, N, Si and S, and
m and n are each independently an integer of 0 to 4.

Specifically, the aromatic cyclic compound having two or more hydroxyl groups represented by Chemical Formula 4 has a backbone in which two naphthalenes are linked, and one or more hydroxyl groups may be linked to each naphthalene.

Meanwhile, the aromatic cyclic compound having two or more hydroxyl groups represented by Chemical Formula 5 may have a form in which two aryl groups substituted with one or more hydroxyl groups are substituted at the 9th position of fluorene.

The aromatic cyclic compound having two or more hydroxyl groups represented by Chemical Formula 4 or 5 can realize high refractive index of a diffraction light guide plate by conjugation of aromatic functional groups, and due to such aromatic functional groups, even if the aromatic cyclic compound is included in the diffraction light guide plate and sulfur atom content decreases, refractive index decrease may be minimized, and glass transition temperature(Tg) of the diffraction light guide plate may be increased, thus improving mechanical properties.

Meanwhile, in Chemical Formula 4, each of $R_7$ and $R_8$ may be independently deuterium, halogen, cyano, nitrile, nitro, amino, methyl or ethyl, but is not limited thereto.

And, each of f and g may be independently 1 or 2.

And, each of h and I may be independently 0 or 1.

And, in Chemical Formula 5, each of $Ar_1$ and $Ar_2$ may be independently phenyl or naphthalenyl substituted with one or two hydroxyl groups, but is not limited thereto.

And, each of $R_9$ and $R_{10}$ may be independently deuterium, halogen, cyano, nitrile, nitro, amino, methyl or ethyl, but is not limited thereto.

And, each of m and n may be independently 0 or 1.

And, the compound represented by Chemical Formula 4 or 5 may be used alone, or in combinations of two or more kinds.

The aromatic cyclic compound having two or more hydroxyl groups may comprise, for example, at least one selected from the following compounds.

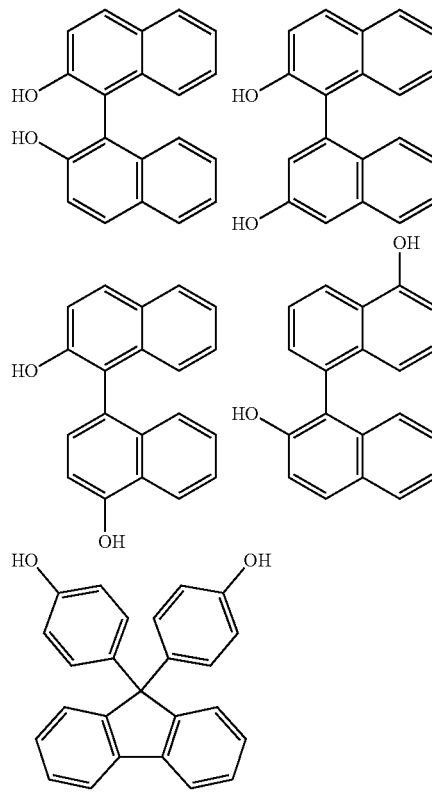

-continued

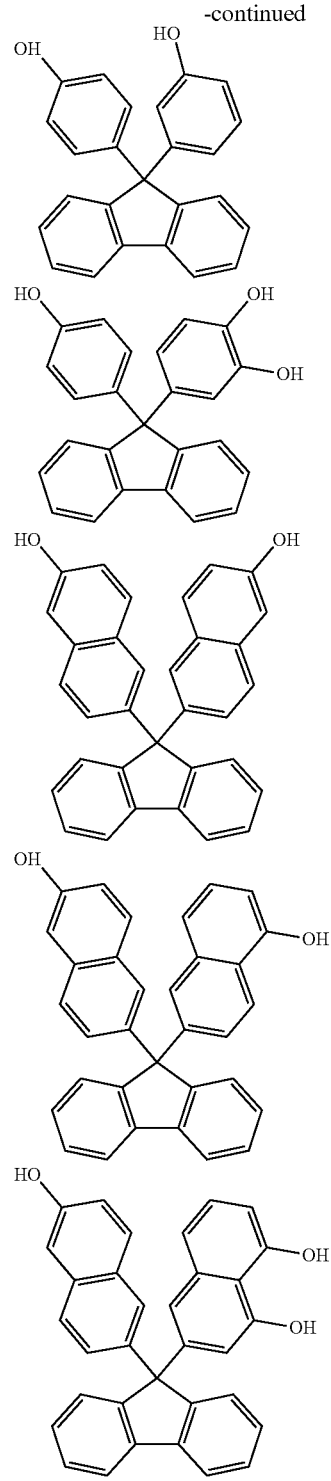

The content of the aromatic cyclic compound having two or more hydroxyl groups may be 0.1 to 10 wt %, 0.5 to 5 wt %, or 1 to 3 wt %, based on 100 wt % of the entire diffraction light guide plate. If the content of the aromatic cyclic compound having two or more hydroxyl groups is too large, refractive index of the diffraction light guide plate may be lowered, and if the content is too small, a curing speed may be too rapid, and thus cord may be generated in the diffraction light guide plate.

And, the continuous phase of polymers may further comprise a catalyst. The catalyst may include, for example, amine, ammonium salt, or phosphate, and the like, and specifically, imidazole derivatives such as imidazole, 2-methyl imidazole, 2-ethyl imidazole, 2-ethyl-4-methyl imidazole, 2-phenyl imidazole, 4-phenyl imidazole, 1-cyanoethyl-2-phenyl imidazole, 1-(2-cyanoethyl)-2-ethyl-4-methyl imidazole, and the like; amine compounds such as dicyandiamide, benzyldimethylamine, 4-(dimethylamino)-N, N-dimethyl benzylamine, 4-methoxy-N,N-dimethylbenzylamine, 4-methyl-N,N-dimethylbenzylamine, N,N-dicyclohexylmethylamine, and the like; hydrazine compounds such as adipic dihydrazide, sebacic dihydrazide, and the like; phosphorous compounds such as triphenylphosphine, and the like may be mentioned. And, as commercially available products, for example, 2MZ-A, 2MZ-OK, 2PHZ, 2P4BHZ, 2P4MHZ(which are trade names of imidazole-based compounds) from Shikoku Chemicals Corporation, U-CAT3503N, UCAT3502T(which are trade names of block isocyanate compounds of dimethylamine) from Sanapro Co., Ltd., and DBU, DBN, U-CATSA102, U-CAT5002 (which are bicyclic amidine compounds and salts thereof), and the like may be mentioned.

The content of the catalyst may be 0.001 to 10 wt %, 0.01 to 5 wt %, or 0.1 to 1 wt %, based on 100 wt % of the entire diffraction light guide plate.

And, the diffraction light guide plate may further comprise other additives used to give specific functions to a display substrate in the technical field to which the present disclosure pertains, such as a UV absorbent, a bluing agent, pigment, and the like.

The continuous phase of polymer may be a photocured product or thermally cured product.

The diffraction lattice pattern(200) and the one surface of the optical layer(300) may respectively have a refractive index of 1.65 or more, 1.70 or more, 1.72 or more, or 1.73 to 2.5 at a wavelength of 532 nm. Common glass substrates have refractive index of 1.65 or more at a wavelength of 532 nm. Thus, the diffraction light guide plate comprising the optical layer having a diffraction lattice pattern formed on one surface, although made of plastic, can realize a refractive index equivalent to a glass substrate, and thus can replace a glass substrate. And, due to high refractive index, in case it is used as lens of a wearable device, it can minimize optical loss and promote transfer of optical information.

And, the glass transition temperature of the diffraction light guide plate may be 40° C. or more, 40° C. to 150° C., 50° C. to 130° C., or 80 to 100° C. In the case of a wearable device, as continuous image transfer and output are progressed, the temperature of lens may increase. Meanwhile, since the diffraction light guide plate can realize glass transition temperature of 40° C. or more, even if used as lens of a wearable device, it can minimize property change according to temperature, thus realizing high durability.

Haze of the diffraction light guide plate may be 4.0% or less, 3.0% or less, 2.0% or less, or 1.5 to 0.01%. Since the diffraction light guide plate exhibits a refractive index of 1.65 or more without including inorganic particles, it does not induce haze, and thus has high visibility, And, pencil hardness of the diffraction light guide plate may be HB or more, H or more, or 2H or more. Since the diffraction lattice pattern(200) is formed as an integrated structure without an interface on one surface of the optical layer(300), mechanical properties such as pencil hardness and strength, and the like are excellent.

And, the diffraction light guide plate, although comprises one or more pattern units, may have thickness deviation of 3.0% or less, 2.5% or less, 1% or less, or 0.1 to 1%. The lower the thickness deviation, the higher the thickness uniformity of the diffraction light guide plate, and thus the diffraction light guide plate according to one embodiment may have excellent thickness uniformity.

And, the thickness deviation of the diffraction light guide plate may be calculated by the following General Formula 1.

Thickness deviation (%)=(maximum deviation/average thickness)×100     [General Formula 1]

The maximum thickness or minimum thickness may be measured by a contact measurement method using Digimatic Thick 547-401equipment from Mitsutoyo, under 25° C. and 50 RH % atmosphere. Alternatively, the maximum thickness or minimum thickness may be measured by a non-contact measurement method using IFS-2405-1 or IFC-2451-MP equipment from Micro-Epsilon, under 25° C. and 50 RH % atmosphere.

The average thickness may be the average value of thicknesses measured at the interval of 10 mm radius and 22.5°, with any point of randomly disposed specimen as a starting point, by a contact measurement method using Digimatic Thick 547-401 equipment from Mitsutoyo, under 25° C. and 50 RH % atmosphere. Alternatively, the average thickness may be the average value of thicknesses measured at the interval of 1 mm width and 1 mm length, with any point of randomly disposed specimen as a starting point, by a non-contact measurement method using OWTM(Optical Wafer Thickness Measurement system) equipment from Fiberpro, under 25° C. and 50 RH % atmosphere.

Warp of the diffraction light guide plate may be 100 μm or less, 50 μm or less, 20 μm or less, 10 μm or less, or 0.1 to 10 μm. The diffraction light guide plate manufactured by the manufacturing method of a diffraction light guide plate according to one embodiment may satisfy the above warp range, and if the warp of a diffraction light guide plate is greater than 100 μm, a reflection angle of light entering into the diffraction light guide plate cannot be maintained, and in case used for a virtual reality device, and the like, resolution may be degraded.

Warp is the overall curve of the diffraction light guide plate indicated as a numerical value, and may be calculated by the following General Formula 2.

Warp=maximum deviation of central side and base side−minimum deviation of central side and base side     [General Formula 2]

The central side in the General Formula 2 is a side corresponding to the middle of the thickness of a diffraction light guide plate, and the base side is a side calculated by least squares fit to the central side in the measurement region. Thus, the warp corresponds to a difference between the maximum deviation and minimum deviation of the base side and central side.

Meanwhile, the central side may be drawn by a non-contact measurement method using OWTM(Optical Wafer Thickness Measurement system) equipment from Fiberpro, under 25° C. and 50 RH % atmosphere.

And, the diffraction light guide plate may have very high transmittance of 80% or more, 80 to 99%, or 85 to 90%, specifically measured according to JIS K 7361 when the thickness is 1 mm.

And, the diffraction light guide plate may have low yellow index(YI) of 1 to 30, 2 to 22, 2.1 to 10, 2.2 to 3, or 2.3 to 4, specifically measured according to ASTM E313-1973.

The diffraction light guide plate may be for diffraction light guide lens of a wearable device. Specifically, the wearable device is an augmented reality device or a virtual reality device, and the diffraction light guide plate may be included as lens of the wearable device, and can facilitate input, movement and transmission of optical information, due to the diffraction lattice pattern included in the diffraction light guide plate.

According to another embodiment of the present disclosure, there is provided a method for manufacturing the above described diffraction light guide plate.

The inventors recognized that in case a curable composition is injected into a common mold equipment and cured to prepare base material, the cured product may be delaminated from a mold substrate by cure shrinking of the curable composition, and thus delamination spot may remain on the surface of the prepared base material, and thickness uniformity may be significantly damaged, and that in case an imprint resin composition is applied on the base material prepared by a molding process and dried to form a resin layer, and then, a diffraction light guide plate is manufactured through an imprint process on the resin layer, the interfacial adhesion between the base material and imprinted resin layer may be poor, and thus it may be difficult to secure high pencil hardness, and thereby developed the present disclosure.

The method for manufacturing a diffraction light guide plate according to another embodiment comprises steps of: preparing mold equipment comprising a flat lower substrate, a flat upper substrate, buffer spacers positioned between the flat lower substrate and the flat upper substrate, and a template engraved with diffraction lattice pattern, included in the flat lower substrate or flat upper substrate, wherein a molding space is partitioned by the buffer spacers;

fully charging a curable composition in the molding space; and compressing the curable composition with a load of the flat upper substrate, and curing the curable composition, wherein curable composition comprises an episulfide compound, a thiol compound, and an aromatic cyclic compound having two or more hydroxyl groups, and the step of compressing the curable composition with a load of the flat upper substrate and curing the curable composition is conducted so as to fulfill the following Formula 1:

{(load of flat upper substrate+shrinking force of curable composition)×0.95}≤compressive stress of buffer spacers≤{(load of flat upper substrate+shrinking force of curable composition)×1.05}.   [Formula 1]

Since the method for manufacturing a diffraction light guide plate according to another embodiment uses the buffer spacers, during curing of the curable composition, delamination of the cured product from the flat lower substrate and flat upper substrate of the mold equipment by cure shrinking of the curable composition may be minimized, and thus a diffraction light guide plate having very excellent surface flatness and thickness uniformity can be prepared.

And, by using the template engraved with a diffraction lattice pattern, simultaneously with curing of the curable composition, the diffraction lattice pattern engraved in the template is compressed on the upper or lower part of the cured product, and thus a diffraction lattice pattern may be formed on one surface of the finally prepared diffraction light guide plate. Thus, a diffraction light guide plate comprising an optical layer having a diffraction lattice pattern formed on one surface may be prepared by simple one-step process, without necessity to conduct additional resin layer forming process and imprint process, and since the diffraction lattice pattern is formed as an integrated structure on one surface of the optical layer without an interface, mechanical properties such as pencil hardness and strength, and the like are excellent.

Meanwhile, the compressive stress of the buffer spacer fulfills the above Formula 1. Since the compressive stress of the buffer spacer has a difference within 5% of the sum of load of the flat upper substrate and shrinking force of the curable composition, in the step of curing the curable composition, the flat upper substrate adheres to the curable composition by cure shrinking of the curable composition. Thus, the prepared diffraction light guide plate exhibits excellent surface flatness, and thus can realize excellent thickness uniformity.

And, since the compressive stress of the buffer spacer fulfills the above Formula 1, the template included in the flat lower substrate or flat upper substrate may also adhere to the curable composition, and thus the diffraction lattice pattern engraved in the template may be clearly shown on one surface of the cured product as a diffraction lattice pattern.

Meanwhile, if the compressive stress of the buffer spacer is smaller than {(load of flat upper substrate+shrinking force of curable composition)×0.95}, curing may be finished before equilibrium is reached, and thus thickness non-uniformity of the diffraction light guide plate may be generated, and the diffraction lattice pattern may not be clearly shown. And, if the compressive stress of the buffer spacer is larger than {(load of flat upper substrate+shrinking force of curable composition)×1.05}, shrinking non-uniformity may be generated during curing, and thus appearance of the diffraction light guide plate may be poor.

Specifically, according to one example of the present disclosure, the Formula 1 may fulfill the following Formula 1-1, Formula 1-2, or Formula 1-3.

{(load of flat upper substrate+shrinking force of curable composition)×0.97}≤compressive stress of buffer spacers≤{(load of flat upper substrate+shrinking force of curable composition)×1.03}.   [Formula 1-1]

{(load of flat upper substrate+shrinking force of curable composition)×0.98}≤compressive stress of buffer spacers≤{(load of flat upper substrate+shrinking force of curable composition)×1.02}.   [Formula 1-2]

{(load of flat upper substrate+shrinking force of curable composition)×0.99}≤compressive stress of buffer spacers≤{(load of flat upper substrate+shrinking force of curable composition)×1.01}.   [Formula 1-3]

Specifically, the compressive stress of the buffer spacer may have a difference within 3%, 2%, or 1% of the sum of load of the flat upper substrate and shrinking force of the curable composition, and thereby, the prepared diffraction light guide plate may exhibit more excellent surface flatness, and realize more excellent thickness uniformity.

The units of the load of a flat upper substrate, shrinking force of a curable composition and compressive stress of buffer spacer may be kgf or N.

The buffer spacer may prevent delamination of the cured product of the curable composition from the flat upper substrate by cure shrinking. Specifically, since the buffer spacer has compressive stress considering the degree of cure shrinking of the curable composition and load of the flat upper substrate, it may be compressed by load of the flat upper substrate according to cure shrinking of the curable composition, and thus perform a function for maintaining adherence of the curable composition and the flat upper substrate in the step of curing the curable composition. And, in case the template engraved with diffraction lattice pattern is included in the flat upper substrate and positioned on the flat upper substrate, the buffer spacer may perform a function for maintaining adherence of the template and curable composition in the step of curing the curable composition.

The load of the flat upper substrate may be 3.4 N to 34 N, 5.9 N to 27 N, or 7 N to 25 N. In case the load of the flat upper substrate is within the above range, deformation by cure shrinkage during curing of the curable composition may be minimized, decrease in transmittance during photocuring of the curable composition may be minimized, and discharge non-uniformity of reaction heat during thermal curing of the curable composition may be minimized thereby inducing uniform curing of the curable composition. Meanwhile, in case the template engraved with a diffraction lattice pattern is included in the flat upper substrate and positioned on the flat upper substrate, the load of the flat upper substrate corresponds to a load including a load due to the template engraved with diffraction lattice pattern.

In the Formula 1, cure shrinking force of a curable composition may be measured as follows. Specifically, under 25° C. and 50 RH % atmosphere, using Texture Analyzer equipment from TA Corporation, a certain amount of a curable composition is applied on the lower jig, and then, the upper jig is lowered to contact with the curable composition, and the initial value of force is reported. And, a temperature is raised to 90° C. and maintained for 5 hours, and then, the final value of force is reported, and a difference between the final value and the initial value is measured as shrinking force.

In the Formula 1, the compressive stress of buffer spacer may be measured as follows. Specifically, under 25° C. and 50 RH % atmosphere, using Texture Analyzer equipment from TA Corporation, when 5×5 $mm^2$ specimen is compressed at compressive speed of 1 mm/min, a force when deformation of a specimen((initial thickness−thickness after deformation)/initial thickness) is reached may be measured.

The molding space may be partitioned by the buffer spacers. Specifically, in case a template engraved with a diffraction lattice pattern is positioned on the flat lower substrate, the molding space is partitioned by the buffer spacers, and means an empty space between the template and the flat upper substrate. Alternatively, in case a template engraved with diffraction lattice pattern is positioned on the flat upper substrate, the molding space is partitioned by the buffer spacers, and means an empty space between the template and the flat lower substrate.

The method for manufacturing a light guide plate according to another embodiment may comprise a step of fully charging a curable composition in the molding space.

Specifically, the step of fully charging a curable composition may mean injecting the curable composition in the molding space and sufficiently fill such that the curable composition may be adhered to the flat lower substrate (or flat upper substrate) and the template engraved with a diffraction lattice pattern. Particularly, the curable composition may be adhered without a gap over the entire engraved pattern surface of the template. Specifically, the step of fully charging a curable composition may mean injecting the curable composition in the molding space at 95 vol % or more, 97 vol % or more, 99 vol % or more, or 100 vol %.

And, the step of fully charging a curable composition may be conducted by various methods, such as a method of injecting the curable composition in a molding space partitioned by the buffer spacers and the flat lower substrate, and laminating the flat upper substrate comprising a template; a method of injecting the curable composition in a molding space partitioned by the buffer spacers and the flat lower substrate comprising a template, and laminating the flat upper substrate; or a method of equipping an inlet in the mold equipment and injecting the curable composition, and the like.

Meanwhile, the curable composition may be a photocurable composition or a thermally curable composition, and is not limited as long as it is used to prepare a diffraction light guide plate. Specifically, the curable composition is not limited as long as it can be used to prepare a diffraction light guide plate by mold casting. For example, the curable composition may comprise the above explained episulfide compound, thiol compound, and aromatic cyclic compound having two or more hydroxyl groups. Specifically, the curable composition may comprise an episulfide compound represented by Chemical Formula 1, a thiol compound represented by Chemical Formula 2 or 3, and an aromatic ring compound having two or more hydroxyl groups represented by Chemical Formula 4 or 5. Meanwhile, to Chemical Formulas 1 to 5, the above explanations for the diffraction light guide plate are applied.

And, in the photocurable composition, the weight ratio of the thiol compound to the aromatic cyclic compound having two or more hydroxyl groups may be 5:5 to 9:1, 7:3 to 8.5:1.5, or 7:3 to 8:2. If the weight ratio of the thiol compound to the aromatic cyclic compound having two or more hydroxyl groups is less than 5:5, it may be difficult to realize high refractive index, and if it is greater than 9:1, it may be difficult to control a curing speed during curing of the curable composition, and thus cord may be generated in the diffraction light guide plate, and it may be difficult to store the curable composition for a long time.

And, in the total 100 wt % of the photocurable composition, the content of the episulfide compound may be 50 to 99 wt %, 60 to 95 wt %, or 70 to 90 wt %. If the content of the episulfide compound is too large, the content of the cured product of a thiol compound, and the like may relatively decrease, and thus uncured by-products may be generated, and thereby, glass transition temperature of a diffraction light guide plate may be lowered, and yellow index(YI) may increase. On the contrary, if the content of the episulfide compounds is too small, the content of a curing agent of a thiol compound, and the like may relatively increase, and thus the curing agent may not be sufficiently dissolved in the curable composition, or uncured by-products may be generated, and thereby, glass transition temperature of a diffraction light guide plate may be lowered, and yellow index(YI) may increase.

And, in the total 100 wt % of the photocurable composition, the content of the thiol compound may be 1 to 30 wt %, 5 to 25 wt %, or 7 to 10 wt %. If the content of the thiol compound is too large, the solid thiol compound may not be sufficiently dissolved in the curable composition, or the content of other components such as an episulfide compound, and the like may relatively decrease, and thus uncured by-products may be generated, and thereby, glass transition temperature of a diffraction light guide plate may be lowered, and yellow index(YI) may increase. On the contrary, if the content of the thiol compound is too small, the content of other components such as an episulfide compound, and the like may relatively increase, and thus uncured by-products may be generated, and thereby, glass transition temperature of a diffraction light guide plate may be lowered, and yellow index(YI) may increase.

And, the aromatic cyclic compound having two or more hydroxyl groups included in the photocurable composition may control a curing reaction speed because during the curing reaction of the episulfide compound and thiol compound, ring-opening polymerization reaction of the two or more hydroxyl groups and the episulfide compound occurs to progress crosslinking, and the ring-opening polymerization reaction occurs at a slower reaction speed compared to the thiol compound, for example, at the reaction speed of 1/1,000. And, in the aromatic cyclic compound having two or more hydroxyl groups, ring-opening polymerization reaction of the aromatic ring occurs at a slower reaction speed compared to the aliphatic hydroxyl groups, for example, at the reaction speed of ½, thus controlling curing reaction speed, and thereby, rapid curing may be prevented even after mixing the curable composition, and a curing reaction may not be allowed to progress during long-term storage, for example, for more than 7 days under temperature condition of 0° C., and furthermore, cord in the diffraction light guide plate due to rapid curing may be prevented.

And, in the total 100 wt % of the photocurable composition, the content of the aromatic cyclic compound comprising two or more hydroxyl groups may be 0.1 to 10 wt %, 0.5 to 5 wt %, or 1 to 3 wt %. If the content of the aromatic cyclic compound comprising two or more hydroxyl group is too large, it may not be sufficiently dissolved in the curable composition, or refractive index of the cured product, i.e., a diffraction light guide plate may be lowered, and if it is too small, a curing reaction speed cannot be controlled.

And, the photocurable composition may further comprise a catalyst. The catalyst is not specifically limited as long as it performs a function for increasing the curing reaction of the curable composition, but for example, imidazole derivatives such as imidazole, 2-methyl imidazole, 2-ethyl imidazole, 2-ethyl-4-methyl imidazole, 2-phenyl imidazole, 4-phenyl imidazole, 1-cyanoethyl-2-phenyl imidazole, 1-(2-cyanoethyl)-2-ethyl-4-methyl imidazole, and the like; amine compounds such as dicyandiamide, benzyldimethylamine, 4-(dimethylamino)-N,N-dimethyl benzylamine, 4-methoxy-N,N-dimethylbenzylamine, 4-methyl-N, N-dimethylbenzylamine, N, N-dicyclohexylmethylamine, and the like; hydrazine compounds such as adipic dihydrazide, sebacic dihydrazide, and the like; phosphorous compounds such as triphenylphosphine, and the like may be mentioned. And, as commercially available products, for example, 2MZ-A, 2MZ-OK, 2PHZ, 2P4BHZ, 2P4MHZ(which are trade names of imidazole-based compounds) from Shikoku Chemicals Corporation, U-CAT3503N, UCAT3502T(which are trade names of block isocynate compounds of dimethylamine) from Sanapro Co., Ltd., and DBU, DBN, U-CATSA102, U-CAT5002 (bicyclic amidine compounds and salts thereof), and the like may be mentioned.

The content of the catalyst may be 0.001 to 10 wt %, 0.01 to 5 wt %, or 0.1 to 1 wt %, based on 100 wt % of the total curable composition. If the content of the catalyst is too large, a curing reaction may be rapidly progressed, and thus there may be a problem in terms of handling safety of the curable composition due to overheat, long term storage may be difficult, and cord may be generated. Meanwhile, if the content of the catalyst is too small, due to under-cure, optical and mechanical properties of the cured product, i.e., a diffraction light guide plate may be deteriorated.

Besides, the curable composition may further comprise other additives used to give specific functions to a display substrate in the technical field to which the present disclosure pertains, such as an UV absorbent, a bluing agent, pigment, and the like.

The curable composition may be a photocurable composition or a thermally curable composition. Specifically, the curable composition may be a thermally curable composition.

Meanwhile, the cure shrinkage of the curable composition may be 15% or less, 1% to 15%, 1% to 12%, or 1% to 10%, but is not limited thereto.

And, the curable composition may be stored for a long time, and particularly, it may be stored for a long time even if it comprises a catalyst. And, cord generated due to rapid curing may be inhibited. Specifically, the curable composition may have a viscosity of 4000 cP or less, 3000 cP or less, 2500 cP or less, 2000 cP or less, 1000 cP or less, 500 cP or less, 300 cP or less, or 100 to 200 cP, after maintained at a temperature of −5 to 0° C. for 12 hours.

The manufacturing method of a light guide plate according to another embodiment may comprise a step of compressing the curable composition with a load of the flat upper substrate, and curing the curable composition.

FIG. 2 is a schematic diagram showing the cross-section of mold equipment, in the step of curing the curable composition. Specifically, FIG. 2 shows that in the molding space of molding equipment comprising buffer spacers(503) between a flat lower substrate(501) and a flat upper substrate (502) including a template(504) engraved with a diffraction lattice pattern, a curable composition(600) is injected and fully charged. As such, after the curable composition is fully charged, photocuring and/or thermal curing may be progressed to manufacture a diffraction light guide plate.

When the curable composition is heat treated for thermal curing, a temperature rise speed may be 2° C./min or less, 1° C./min or less, or 0.1 to 0.5° C./min. If the temperature rise speed is within the above range, positional deviation of heat transferred to the curable composition may be minimized, and discharge non-uniformity of reaction heat may be minimized, thus inducing uniform curing of the curable composition.

During the thermal curing, the final temperature may be 50 to 100° C., or 60 to 80° C., and by placing three or more isothermal maintenance sections at lower temperature than the final temperature before reaching the final temperature, positional deviation of heat transferred to the curable composition may be minimized. A temperature difference between the isothermal maintenance sections may be 10° C. to 20° C., and the maintenance time of the isothermal maintenance sections may be respectively 1 to 5 hours. For example, after leaving the curable composition at room temperature(25° C.) for 2 hours, it may be thermally cured at 45° C. for 2 hours, at 60° C. for 2 hours, at 75° C. for 2 hours, and at 90° C. for 4 hours, to manufacture a diffraction light guide plate.

In the step of curing the curable composition, a diffraction lattice pattern may be formed on one surface of the optical layer by the template engraved with a diffraction lattice pattern. To the diffraction lattice pattern, the above explanations for the diffraction lattice pattern formed on one surface of the optical layer included in the diffraction light guide plate apply.

The flexural modulus of the flat lower substrate and the flat upper substrate may be respectively 3 GPa or more, 10 GPa or more, 20 GPa or more, or 40 GPa to 300 GPa. If the flexural modulus of the flat lower substrate and the flat upper substrate are within the above range, bowing of the flat upper substrate may be minimized, thereby significantly increasing thickness uniformity of the manufactured diffraction light guide plate.

The flexural modulus of the template engraved with a diffraction lattice pattern may be 1 to 20 GPa, 1.5 to 15 GPa, or 2 to 10 GPa. If the flexural modulus of the template engraved with a diffraction lattice pattern is less than 1 GPa, uniformity of the diffraction lattice pattern may be damaged according to cure shrinking of the curable composition, and if it is greater than 20 GPa, the diffraction lattice pattern engraved in the template may be damaged due to excessive rigidity.

The surface flatness of the flat lower substrate and the flat upper substrate may be respectively 5 μm or less, 2 μm or less, or 0.01 to 1 μm. If the surface flatness values of the flat lower substrate and the flat upper substrate are within the above range, the surface flatness of the manufactured diffraction light guide plate may be significantly improved compared to a common diffraction light guide plate.

The surface flatness may be measured as follows. Specifically, under 25° C. and 50 RH % atmosphere, using ASI(aspheric stitching interferometry) equipment from QED Company, one point per 0.16×0.16 mm² may be measured in the region of 200 mm diameter, or using three-dimensional shape measuring apparatus from Duckin Corporation, a difference between the highest value and the lowest value of the heights measured at an interval of 5 mm radius and 11.25° with any starting point in the region of 200 mm diameter, may be measured.

The flat lower substrate and the flat upper substrate may be respectively a transparent substrate. Specifically, the flat lower substrate and the flat upper substrate may be respectively a glass substrate, which may effectively conduct photocuring of the curable composition by excellent light transmission.

The elastic modulus of compressibility of the buffer spacer may be 0.1 MPa to 10 MPa, 0.1 MPa to 5 MPa, 0.1 MPa to 3 MPa, or 0.1 MPa to 2 MPa. If the elastic modulus of compressibility of the buffer spacer is within the above range, when contacting the flat upper substrate, load may be uniformly transferred to the curable composition, and thus thickness uniformity of the diffraction light guide plate may be increased, and the diffraction lattice pattern engraved in the template may be clearly shown on one surface of the cured product as a diffraction lattice pattern.

The measurement method of the elastic modulus of compressibility of the buffer spacer is as follows. Under 25° C. and 50 RH % atmosphere, using Texture Analyzer from TA Corporation, when compressing 5×5 mm² specimen at the compression speed of 1 mm/min, a gradient of measured force to specimen deformation ((initial thickness—thickness after deformation)/initial thickness) may be measured. And, in case the buffer spacer consists of two or more different layers, the elastic modulus of compressibility of the buffer spacer may be the measurement value of a gradient of measured force to specimen deformation ((initial thickness—thickness after deformation)/initial thickness), when preparing a laminated specimen of 5×5 mm² and compressing at the compression speed of 1 mm/min.

The buffer spacer may have a structure wherein a non-elastic layer and an elastic layer are laminated, a structure wherein an elastic layer is positioned between non-elastic layers, or a structure wherein a non-elastic layer is positioned between elastic layers. Meanwhile, in case the buffer spacer has a structure wherein a non-elastic layer and an elastic layer are laminated, a structure wherein an elastic layer is positioned between non-elastic layers, or a structure wherein a non-elastic layer is positioned between elastic layers, the elastic modulus of compressibility of the buffer spacer may be the elastic modulus of compressibility of the elastic layers.

Since the buffer spacer may be designed considering the degree of shrinking of the curable composition, the non-elastic layers may function as a support, and the elastic layers may function for controlling height change according to shrinking of the curable composition.

The cure shrinkage of the curable composition may be 15% or less, 1% to 15%, 1% to 12%, or 1% to 10%.

The cure shrinkage of the curable composition may be calculated by the following General Formula 3.

Cure shrinkage (%)={(volume before curing−volume after complete curing)/volume before curing}× 100.  [General Formula 3]

The method for manufacturing a diffraction light guide plate according to another embodiment may further comprise a step of obtaining a diffraction light guide plate from the mold equipment. Specifically, the step of obtaining a diffraction light guide plate may comprise removing the flat upper substrate, the flat lower substrate and the template engraved with a diffraction lattice pattern to obtain a diffraction light guide plate. The removal of the flat upper substrate, the flat lower substrate and the template may mean separation of the flat upper substrate, the flat lower substrate and the template from the diffraction light guide plate, which is the cured product of the curable composition, after curing of the curable composition is completed.

To the properties of the diffraction light guide plate manufactured by the manufacturing method of a diffraction light guide plate according to another embodiment, such as a thickness and thickness uniformity, refractive index, glass transition temperature, haze, and the like, the above explanations for a diffraction light guide plate are applied. And, the diffraction light guide plate may be for diffraction light guide lens of a wearable device, as mentioned above.

Meanwhile, the thickness of the diffraction light guide plate may be controlled according to the distance between the flat lower substrate and the flat upper substrate and the cure shrinkage of the curable composition, and the thickness of the diffraction light guide plate may be controlled according to the use of the diffraction light guide plate within the above range.

The surfaces of the flat lower substrate, the flat uppers substrate and the template engraved with a diffraction lattice pattern may be respectively treated with a releasing agent. The releasing agent is not limited as long as it is commonly used in the art. For example, surface treatment with the releasing agent may be surface coating with a fluorine-containing silane coupling agent. In case the surface is coated with the releasing agent, in the step of obtaining a diffraction light guide plate, the flat lower substrate, the flat upper substrate and the template may be removed while minimizing damage to the surface of the diffraction light guide plate.

Advantageous Effects

According to the present disclosure, there are provided a diffraction light guide plate that not only has excellent thickness uniformity and flatness, but also has low haze, excellent mechanical properties such as pencil hardness and strength, and the like, is lighter than glass or tempered glass, and can realize high refractive index, and a manufacturing method a diffraction light guide plate that can manufacture such a diffraction light guide plate by simple one-step process.

BRIEF DESCRIPTION OF THE DRAWINGS

FIG. 1 is a schematic diagram of the cross-section of the optical layer included in the diffraction light guide plate according to one embodiment of the present disclosure.

FIG. 2 is a schematic diagram of the cross-section of mold equipment, in the step of curing a curable composition, in the manufacturing method of a diffraction light guide plate according to another embodiment of the present disclosure.

DETAILED DESCRIPTION

The present disclosure will be explained in detail in the following examples. However, these examples are presented only as the illustrations of the present disclosure, and the scope of the present disclosure is not limited thereby.

Preparation Example 1: Preparation of Curable Composition

A curable composition comprising 89.0 parts by weight of bis(β-epithiopropyl)sulfide, 7.0 parts by weight of 2,2'-thiodiethanethiol, 3.0 parts by weight of 2.2'-dihydroxy-1,1'-binaphthalene, and 1.0 part by weight of a catalyst N,N-dicyclohexylmethylamine was prepared.

The cure shrinkage of the prepared curable composition was measured by the above explained measurement method of cure shrinkage, and modulus of compressive stress calculated by dividing the measured cure shrinkage by the volume of a sample was $2.5*10^3$ $N/m^3$.

Preparation Example 2: Preparation of Curable Composition

A curable composition comprising 89.5 parts by weight of bis(β-epithiopropyl)sulfide, 9.5 parts by weight of 2,2'-thiodiethanethiol, and 1.0 part by weight of a catalyst N,N-dicyclohexylmethylamine was prepared.

The cure shrinkage of the prepared curable composition was measured by the above explained measurement method of cure shrinkage, and modulus of compressive stress calculated by dividing the measured cure shrinkage by the volume of a sample was $2.5*10^3$ $N/m^3$.

Preparation Example 3: Preparation of Imprint Resin Composition

An imprint resin composition comprising 8.3 parts by weight of zirconia particles having a diameter of 20 nm, 8.3 parts by weight of dipentaerythritol hexaacrylate(DPHA), 83.0 parts by weight of butyl carbitol acetate and 0.4 parts by weight of ethyl(2,4,6-trimethylbenzoyl)phenylphosphinate was prepared.

Examples and Comparative Examples: Manufacture of Diffraction Light Guide Plate

Example 1

A glass substrate having a flexural modulus of 70 GPa, surface flatness of 0.5 μm, thickness of 30 mm and diameter of 200 mm was prepared as a lower substrate, and on the lower substrate, a template (flexural modulus: 3 GPa) engraved with a diffraction lattice pattern was attached. Wherein, it was attached such that the center of the lower substrate and the center of the template contact, the template was polyethyleneterephthalate(PET) having a diameter of 150 mm and thickness of 200 μm, and the pitch of the engraved diffraction lattice pattern was 405 nm and the depth was 500 nm.

Thereafter, buffer spacers made of silicon, having elastic modulus of compressibility of 1.0 MPa, height of 1,007 μm, and cross-section of 10×10 $mm^2$ were positioned at the interval of 120° so as to contact the circumference of the lower substrate, thus forming molding spaces, and then, the curable composition prepared according to Preparation Example 1 was injected into the molding spaces, and using a glass substrate having flexural modulus of 70 GPa, load of 8.2 N, diameter of 200 mm, and surface flatness of 0.5 μm as a upper substrate, the curable composition was fully charged in the molding spaces.

And, the curable composition was put in a convection oven from Jeio Tech Co., Ltd., and left at room temperature for 2 hours, and then, a temperature rise speed was set to 1° C./min, and it was photocured at 45° C. for 2 hours, at 60° C. for 2 hours, at 75° C. for 2 hours, and at 90° C. for 4 hours to manufacture a diffraction light guide plate with a thickness of 0.8 mm.

Comparative Example 1

A diffraction light guide plate was manufactured by the same method as Example 1, except that the curable composition prepared according to Preparation Example 2 was used instead of the curable composition prepared according to Preparation Example 1.

Comparative Example 2

A glass substrate having a flexural modulus of 70 GPa, surface flatness of 0.5 μm, thickness of 30 mm and diameter of 200 mm was used as a lower substrate, and buffer spacers made of silicon, having elastic modulus of compressibility of 1.0 MPa, height of 804 μm, and cross-section of 10×10 $mm^2$ were positioned at the interval of 120° so as to contact the circumference of the lower substrate, thus forming molding spaces, and then, the curable composition prepared according to Preparation Example 1 was injected into the molding spaces, and using a glass substrate having flexural modulus of 70 GPa, load of 8.2 N, diameter of 200 mm, and surface flatness of 0.5 μm as a upper substrate, the curable composition was fully charged in the molding spaces.

And, the curable composition was put in a convection oven from Jeio Tech Co., Ltd., and left at room temperature for 2 hours, and then, a temperature rise speed was set to 1° C./min, and it was thermally cured at 45° C. for 2 hours, at 60° C. for 2 hours, at 75° C. for 2 hours, and at 90° C. for 4 hours to manufacture a plastic substrate.

On the plastic substrate, the imprint resin composition (refractive index 1.70) prepared according to Preparation Example 3 was applied and dried to form an imprint resin layer with a thickness of 1 μm. And then, on the imprint resin layer, a template(diameter 150 mm, thickness 200 μm, polyethyleneterephthalate) engraved with a diffraction lattice pattern of 405 nm pitch and 1 μm depth was compressed under 40° C. temperature and 20 bar pressure conditions to form diffraction lattice, and then, irradiated by UV(360 nm light source) at 1000mJ/$cm^2$ to prepare a diffraction light guide plate with a thickness of 0.8 mm, and it was cut to the form of 6×5 cm rectangles.

Comparative Example 3

A diffraction light guide plate was manufactured by the same method as Comparative Example 2, except that the curable composition prepared according to Preparation Example 2 was used instead of the curable composition prepared according to Preparation Example 1.

Evaluation

1. Measurement of Refractive Index

The refractive indexes of the diffraction light guide plates of Examples and Comparative Examples were measured using spectroscopic ellipsometry from Ellipso Technology Co. Ltd., and the results were shown in the following Table 1.

2. Measurement of Haze

The haze of the diffraction light guide plates of Examples and Comparative Examples was measured by ASTM D-100, and the results were shown in the following Table 1.

3. Measurement of Pencil Hardness

After fixing a pencil on the surface of each diffraction light guide plate of Examples and Comparative Examples at a load of 0.5 kg, and an angle of 45°, the surface was scratched according to pencil hardness and it was judged with the unaided eye whether or not scratched, and the maximum pencil hardness at which scratch is not generated was shown in the following Table 1.

4. Measurement of Warp

For the diffraction light guide plates of Examples and Comparative Examples, rectangular specimens with a long axis of 60 mm and a short axis of 400 mm were prepared, warp was calculated by the following General Formula 2, and the results were shown in the following Table 1.

Warp=maximum deviation between central side and base side−minimum deviation between central side and base side  [General Formula 2]

The central side may be drawn by measuring a thickness of the diffraction light guide plate and a distance between a base optical body mounted on the lower part of the diffraction light guide plate and the diffraction light guide plate, by a non-contact measurement method using OWTM(Optical Wafer Thickness Measurement system) equipment of Fiberpro, under 25° C. and 50 RH % atmosphere. Meanwhile, the base side may be calculated by least squares fit to the central side.

5. Measurement of Glass Transition Temperature

For the diffraction light guide plates of Examples land 2 and plastic substrates of Comparative Examples 2 and 3, glass transition temperatures(Tg) were measured using Pyris 6 DSC(Differential Scanning calorimetry) from Perkin Elmer Inc., and the results were shown in the following Table 1.

TABLE 1

|  | Example 1 | Comparative Example 1 | Comparative Example 2 | Comparative Example 3 |
|---|---|---|---|---|
| Refractive index | 1.73 | 1.71 | 1.73 | 1.71 |
| Haze (%) | 1.4 | 1.4 | 4.1 | 4.2 |
| Pencil hardness | 2H | 2H | 6B | 6B |
| Warp (μm) | 20 | 24 | 55 | 68 |
| Glass transition temperature(° C.) | 85 | 74 | 85 | 74 |

According to the Table 1, it was confirmed that the diffraction light guide plate of Example 1 having a continuous phase of polymers comprising an episulfide compound, a thiol compound, and an aromatic cyclic compound having two or more hydroxyl groups, wherein a diffraction lattice pattern is formed as an integrated structure without an interface on one surface of an optical layer, has high refractive index and glass transition temperature, excellent pencil hardness, and low haze and high visibility.

On the contrary, it was confirmed that the diffraction light guide plate of Comparative Example 1 which does not use an aromatic cyclic compound has lower refractive index and glass transition temperature and higher warp, compared to Example 1. And, it was confirmed that the diffraction light guide plates of Comparative Examples 2 and 3 wherein an interface exists between a diffraction lattice pattern and an optical layer has remarkably high warp and haze, and lowered pencil hardness, compared to Example 1.

DESCRIPTION OF REFERENCE NUMERALS

200: diffraction lattice pattern
300: optical layer
400: pattern unit
501: flat lower substrate
502: flat upper substrate
503: buffer spacer
504: template engraved with diffraction lattice pattern
600: curable composition

What is claimed is:

1. A diffraction light guide plate, comprising an optical layer having a diffraction lattice pattern formed on one surface, wherein:
   the diffraction lattice pattern is formed as an integrated structure without an interface on the one surface of the optical layer;
   a difference in refractive index between the diffraction lattice pattern and the one surface of the optical layer is 0.01 or less;
   the optical layer having diffraction lattice pattern formed on one surface is a continuous phase of polymer comprising an episulfide compound, a thiol compound, and an aromatic cyclic compound including two or more hydroxyl groups; and
   warp of the diffraction light guide plate is 100 μm or less.

2. The diffraction light guide plate according to claim 1, wherein the diffraction lattice pattern and the one surface of the optical layer respectively have a refractive index of 1.65 or more.

3. The diffraction light guide plate according to claim 1, wherein the weight ratio of the thiol compound to the aromatic cyclic compound having two or more hydroxyl groups is 5:5 to 9:1.

4. The diffraction light guide plate according to claim 1, wherein:
   the episulfide compound comprises a compound represented by the following Chemical Formula 1,
   the thiol compound comprises at least one selected from the group consisting of compounds represented by the following Chemical Formulas 2 and 3, and
   the aromatic cyclic compound having two or more hydroxyl groups comprises at least one selected from the group consisting of compounds represented by the following Chemical Formulas 4 and 5:

[Chemical Formula 1]

in Chemical Formula 1,
$R_1$ and $R_2$ are each independently hydrogen or C1 to C10 alkyl,
$R_3$ and $R_4$ are each independently a single bond or C1 to C10 alkylene,
a is an integer of 0 to 4, and
b is an integer of 0 to 6,

[Chemical Formula 2]

in Chemical Formula 2,
$R_5$ and $R_6$ are each independently a single bond or C1 to C10 alkylene,
c is an integer of 0 to 4, and
d is an integer of 0 to 6,

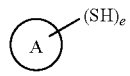
[Chemical Formula 3]

in Chemical Formula 3,
ring A is a 5- or 6-membered aromatic heterocycle comprising one or more of nitrogen (N) and sulfur (S) atoms, and
e is an integer of 1 to 3,

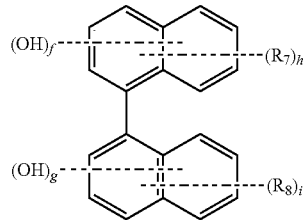
[Chemical Formula 4]

in Chemical Formula 4,
$R_7$ and $R_8$ are each independently deuterium, halogen, cyano, nitrile, nitro, amino, C1 to C40 alkyl, C1 to C40 alkoxy, C3 to C40 cycloalkyl, C1 to C40 alkenyl, C6 to C60 aryl, or C1 to C40 heteroaryl comprising one or more of O, N, Si and S, f and g are each independently an integer of 1 to 7,
h and i are each independently an integer of 0 to 6,
f+h is an integer of 7 or less, and
g+i is an integer of 7 or less,

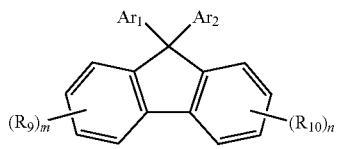
[Chemical Formula 5]

in Chemical Formula 5,
$Ar_1$ and $Ar_2$ are each independently C6 to C60 aryl substituted with one or more hydroxyl groups,
$R_9$ and $R_{10}$ are each independently deuterium, halogen, cyano, nitrile, nitro, amino, C1 to C40 alkyl, C1 to C40 alkoxy, C3 to C40 cycloalkyl, C1 to C40 alkenyl, C6 to C60 aryl, or C1 to C40 heteroaryl comprising one or more of O, N, Si and S, and
m and n are each independently an integer of 0 to 4.

5. The diffraction light guide plate according to claim 1, wherein the thickness of the diffraction light guide plate is 0.1 to 10 mm.

6. The diffraction light guide plate according to claim 1, wherein:
the diffraction lattice pattern comprises two or more pattern units; and
a pitch between the pattern units is 0.1 to 1 µm, and a height of the pattern units is 0.1 to 1 µm.

7. The diffraction light guide plate according to claim 1, wherein:
haze of the diffraction light guide plate is 4.0% or less;
pencil hardness of the diffraction light guide plate is HB or more; and
thickness deviation of the diffraction light guide plate is 3.0% or less.

8. The diffraction light guide plate according to claim 1, wherein:
transmittance of the diffraction light guide plate is 80% or more; and
YI (Yellow Index) of the diffraction light guide plate is 1 to 30.

9. The diffraction light guide plate according to claim 1, wherein the diffraction light guide plate is for a diffraction light guide lens of a wearable device.

* * * * *